US012392666B2

(12) United States Patent
Noritake et al.

(10) Patent No.: US 12,392,666 B2
(45) Date of Patent: Aug. 19, 2025

(54) THERMAL ANALYSIS APPARATUS AND CONTROL SOFTWARE FOR THERMAL ANALYSIS APPARATUS

(71) Applicant: Rigaku Corporation, Tokyo (JP)

(72) Inventors: Koichiro Noritake, Tokyo (JP); Yoshinobu Hosoi, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 208 days.

(21) Appl. No.: 18/234,887

(22) Filed: Aug. 17, 2023

(65) Prior Publication Data

US 2024/0068876 A1   Feb. 29, 2024

(30) Foreign Application Priority Data

Aug. 23, 2022 (JP) ................. 2022-132340

(51) Int. Cl.
*G01N 25/20* (2006.01)
*G01J 5/48* (2022.01)
*G06T 11/20* (2006.01)
*G01J 5/00* (2022.01)

(52) U.S. Cl.
CPC .............. *G01J 5/48* (2013.01); *G06T 11/206* (2013.01); *G01J 2005/0077* (2013.01)

(58) Field of Classification Search
CPC .......... A61B 256/04; A61B 2562/0271; A61B 2562/028; A61B 5/0048; A61B 5/015; G01K 1/00; G01K 1/02; G01K 1/16; G01K 1/20; G01K 3/005; G01K 3/00; G01K 3/02; G01K 3/08; G01K 13/00; G01N 25/00; G01N 25/02; G01N 25/12; G01N 25/16; G01N 25/20; G01N 5/04
See application file for complete search history.

(56) References Cited

U.S. PATENT DOCUMENTS

2021/0088460 A1 * 3/2021 Takaishi ................. G01K 17/00

FOREIGN PATENT DOCUMENTS

JP    2021-001870 A    1/2021

* cited by examiner

*Primary Examiner* — Don K Wong
(74) *Attorney, Agent, or Firm* — XSENSUS LLP

(57) ABSTRACT

A thermal analysis apparatus includes circuitry for displaying a graph of the thermal analysis data relating to temperature or time on a display displaying a sample image on the display, generating color information data of range and type selected from the sample image, displaying a graph of the color information data relating to temperature or time side by side with the graph of the thermal analysis data relating to temperature or time without superimposing both graphs on the display, and displaying a marker at an arbitrary point on one of the graphs and displaying a marker on others of the graphs at a point whose measurement time is synchronized with the point where the marker is displayed.

12 Claims, 18 Drawing Sheets

| | Thermal analysis data | | | Image | Color information | | |
|---|---|---|---|---|---|---|---|
| Record No. | Time(s) | Temp.(°C) | DSC(mW) | No. | R | G | B |
| 1 | 0 | -8.67 | 0.316041 | 1 | 68 | 100 | 138 |
| 2 | 10 | -6.952 | 0.310533 | 2 | 68 | 100 | 138 |
| 3 | 20 | -5.229 | 0.305181 | 3 | 68 | 100 | 138 |
| 4 | 30 | -3.489 | 0.300626 | 4 | 68 | 100 | 138 |
| 5 | 40 | -1.752 | 0.295459 | 5 | 68 | 100 | 138 |
| 6 | 50 | -0.03 | 0.291045 | 6 | 68 | 100 | 138 |
| 7 | 60 | 1.674 | 0.286063 | 7 | 68 | 100 | 138 |
| 8 | 70 | 3.352 | 0.281335 | 8 | 68 | 100 | 138 |
| 9 | 80 | 5.035 | 0.277145 | 9 | 68 | 100 | 138 |
| 10 | 90 | 6.716 | 0.272717 | 10 | 68 | 100 | 138 |
| 11 | 100 | 8.404 | 0.267599 | 11 | 68 | 100 | 138 |
| 12 | 110 | 10.086 | 0.262871 | 12 | 68 | 100 | 138 |
| 13 | 120 | 11.773 | 0.257803 | 13 | 68 | 100 | 138 |
| 14 | 130 | 13.464 | 0.253075 | 14 | 68 | 100 | 138 |
| 15 | 140 | 15.148 | 0.248155 | 15 | 68 | 100 | 138 |
| 16 | 150 | 16.836 | 0.242933 | 16 | 68 | 100 | 138 |
| 17 | 160 | 18.519 | 0.238465 | 17 | 68 | 100 | 138 |
| 18 | 170 | 20.214 | 0.232844 | 18 | 68 | 100 | 138 |
| 19 | 180 | 21.896 | 0.227599 | 19 | 68 | 100 | 138 |
| 20 | 190 | 23.58 | 0.22231 | 20 | 68 | 100 | 138 |

FIG. 8

| Thermal analysis data | | | Image | Color information | | | Color bar |
|---|---|---|---|---|---|---|---|
| Record No. | Time(s) | Temp.(°C) | DSC(mW) | No. | R | G | B | Color |
| 1 | 0 | -8.67 | 0.316041 | 1 | 68 | 100 | 138 | |
| 2 | 10 | -6.952 | 0.310533 | 2 | 68 | 100 | 138 | |
| 3 | 20 | -5.229 | 0.305181 | 3 | 68 | 100 | 138 | |
| 4 | 30 | -3.489 | 0.300626 | 4 | 68 | 100 | 138 | |
| 5 | 40 | -1.752 | 0.295459 | 5 | 68 | 100 | 138 | |
| 6 | 50 | -0.03 | 0.291045 | 6 | 68 | 100 | 138 | |
| 7 | 60 | 1.674 | 0.286063 | 7 | 68 | 100 | 138 | |
| 8 | 70 | 3.352 | 0.281335 | 8 | 68 | 100 | 138 | |
| 9 | 80 | 5.035 | 0.277145 | 9 | 68 | 100 | 138 | |
| 10 | 90 | 6.716 | 0.272717 | 10 | 68 | 100 | 138 | |
| 11 | 100 | 8.404 | 0.267599 | 11 | 68 | 100 | 138 | |
| 12 | 110 | 10.086 | 0.262871 | 12 | 68 | 100 | 138 | |
| 13 | 120 | 11.773 | 0.257803 | 13 | 68 | 100 | 138 | |
| 14 | 130 | 13.464 | 0.253075 | 14 | 68 | 100 | 138 | |
| 15 | 140 | 15.148 | 0.248155 | 15 | 68 | 100 | 138 | |
| 16 | 150 | 16.836 | 0.242933 | 16 | 68 | 100 | 138 | |
| 17 | 160 | 18.519 | 0.238465 | 17 | 68 | 100 | 138 | |
| 18 | 170 | 20.214 | 0.232844 | 18 | 68 | 100 | 138 | |
| 19 | 180 | 21.896 | 0.227599 | 19 | 68 | 100 | 138 | |
| 20 | 190 | 23.58 | 0.22231 | 20 | 68 | 100 | 138 | |
| 21 | 200 | 25.27 | 0.216925 | 21 | 68 | 100 | 138 | |
| 22 | 210 | 26.962 | 0.211807 | 22 | 68 | 100 | 138 | |
| 23 | 220 | 28.648 | 0.206213 | 23 | 68 | 100 | 138 | |
| 24 | 230 | 30.339 | 0.200534 | 24 | 68 | 100 | 138 | |
| 25 | 240 | 32.027 | 0.19473 | 25 | 68 | 100 | 138 | |
| 26 | 250 | 33.717 | 0.188448 | 26 | 68 | 100 | 138 | |
| 27 | 260 | 35.406 | 0.181572 | 27 | 68 | 100 | 138 | |
| 28 | 270 | 37.093 | 0.173928 | 28 | 68 | 100 | 138 | |
| 29 | 280 | 38.782 | 0.163949 | 29 | 68 | 100 | 138 | |
| 30 | 290 | 40.475 | 0.155426 | 30 | 68 | 100 | 138 | |
| 31 | 300 | 42.159 | 0.150112 | 31 | 68 | 100 | 138 | |
| 32 | 310 | 43.851 | 0.142169 | 32 | 68 | 100 | 138 | |
| 33 | 320 | 45.541 | 0.131716 | 33 | 70 | 104 | 146 | |
| 34 | 330 | 47.228 | 0.118808 | 34 | 70 | 104 | 146 | |
| 35 | 340 | 48.919 | 0.104125 | 35 | 83 | 126 | 173 | |
| 36 | 350 | 50.606 | 0.089923 | 36 | 83 | 126 | 173 | |
| 37 | 360 | 52.294 | 0.075947 | 37 | 123 | 161 | 186 | |
| 38 | 370 | 53.985 | 0.058369 | 38 | 123 | 161 | 186 | |
| 39 | 380 | 55.663 | 0.032805 | 39 | 144 | 168 | 178 | |
| 40 | 390 | 57.349 | -0.006049 | 40 | 174 | 181 | 183 | |
| 41 | 400 | 59.035 | -0.039094 | 41 | 186 | 188 | 183 | |
| 42 | 410 | 60.733 | 0.019961 | 42 | 186 | 188 | 183 | |
| 43 | 420 | 62.428 | 0.068964 | 43 | 186 | 188 | 183 | |
| 44 | 430 | 64.116 | 0.068999 | 44 | 186 | 188 | 183 | |
| 45 | 440 | 65.808 | 0.064137 | 45 | 186 | 188 | 183 | |

FIG. 15

THERMAL ANALYSIS APPARATUS AND CONTROL SOFTWARE FOR THERMAL ANALYSIS APPARATUS

CROSS-REFERENCE TO RELATED APPLICATION

The present application claims priority to Japanese Patent Application No. 2022-132340, filed on Aug. 23, 2022, the entire contents of which are incorporated by reference in this application.

BACKGROUND

Field

The present disclosure relates to thermal analysis apparatuses and, in particular, to a thermal analysis apparatus with a sample observation function and a control software for it.

Description of the Related Art

Thermal analysis is defined as "a series of techniques to measure certain physical properties of a substance (including its reaction products) as a function of temperature or time while the temperature of the substance is varied by a constant program. Thermal analysis includes Thermogravimetry (TG), which measures the change in mass of a sample while the sample is heated or cooled and the temperature is changed; Differential Thermal Analysis (DTA), which measures the temperature difference between a sample and a reference material; Differential Scanning Calorimetry (DSC), which measures the heat flow difference between a sample and a reference material; Thermomechanical Analysis (TMA), which measures dimensional changes in a sample; and other techniques, depending on the type of sample and the purpose of the measurement.

Japanese Patent Application Publication No. 2021-001870 (Patent Document 1) discloses a thermal analysis apparatus for measuring thermal behavior accompanying temperature changes of a sample in a heating furnace, which is provided with an aperture in the furnace for observing the sample and with an imaging means for capturing image data of the sample through the aperture. This thermal analysis apparatus superimposes color information generated from the image data, along with the thermal behavior of the sample as its temperature changes, on the temperature. Specifically, a graph of TG data and a graph of R. G and B values are superimposed and displayed with temperature as the horizontal axis.

Among thermal analyses, DSC and DTA generally measure data in a process of increasing and then decreasing temperature and display a graph during the temperature increasing and a graph during the temperature decreasing vertically side by side with the temperature as a horizontal axis. For example, a baseline of DSC data depends on heat capacity of a sample. A graph of DSC data during temperature increasing shifts down and a graph of DSC data during temperature decreasing shifts up, so the two graphs do not overlap. However, the thermal analysis apparatus of the Patent Document 1 displays the graph of DSC data and the graph of color information such as RGB values superimposed each other with temperature as a horizontal axis. Therefore, overlapping of the graph during temperature increasing and the graph during temperature decreasing may make analysis and observation difficult.

The contents of Japanese Patent Application Publication No. 2021-001870 are incorporated herein by reference in their entirety.

SUMMARY

Problems to be Solved

One object of the present disclosure is to provide a thermal analysis apparatus and control software for the thermal analysis apparatus that enables detailed analysis of changes in the state of a sample while identifying and relating in detail the changes in the color of the sample as the sample temperature changes.

Solutions to the Problems

According to one aspect of the present disclosure, a thermal analysis apparatus measures and calculates physical properties of a sample while changing temperature of the sample by heating or cooling it to obtain thermal analysis data and photographs the sample to obtain image data. The apparatus includes a thermal analysis graph display means for displaying a graph of the thermal analysis data relating to temperature or time on a display, a sample image display means for displaying a sample image of the sample data on the display, a color information generation means for generating color information data of range and type selected from the sample image, a color information graph display means for displaying a graph of the color information data relating to temperature or time side by side with the graph of the thermal analysis data relating to temperature or time without superimposing both graphs on the display, and a marker display means for displaying a marker at an arbitrary point on one of the graphs and displaying a marker on others of the graphs at a point whose measurement time is synchronized with the point where the marker is displayed.

In the thermal analysis apparatus of the present disclosure, the marker display means may move the marker displayed on one of the graphs and correspondingly moves the marker displayed on the other of the graphs.

In the thermal analysis apparatus of the present disclosure, the marker display means may move the marker displayed on the graph in response to selecting a value within a predetermined temperature or time range with the slider bar.

In the thermal analysis apparatus of the present disclosure, the color information generating means may selects one or more ranges for generating color information data from the sample image.

According to another aspect of the present disclosure, a control software is provided for a thermal analysis apparatus that measures and calculates physical properties of a sample while changing temperature of the sample by heating or cooling it to obtain thermal analysis data and photographs the sample to obtain image data. The software causes a computer controlling the thermal analysis apparatus to function as follows: a thermal analysis graph display means for displaying a graph of the thermal analysis data relating to temperature or time on a display, a sample image display means for displaying a sample image of the sample data on the display, a color information generation means for generating color information data of range and type selected from the sample image, as a color information graph display means for displaying a graph of the color information data relating to temperature or time side by side with the graph of the thermal analysis data relating to temperature or time without superimposing both graphs on the display, and a marker display means for displaying a marker at an arbitrary point on one of the graphs and displaying a marker on others of the graphs at a point whose measurement time is synchronized with the point where the marker is displayed.

The present disclosure is not limited to the aforementioned purposes or aspects.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a table showing an example of color information data generated by the color information generation means of the thermal analysis apparatus;

FIG. 15 is a table showing an example of colors generated from color information data by a gradation generation means of the thermal analysis apparatus;

DESCRIPTION OF THE EMBODIMENTS

First Embodiment

Figure 1:
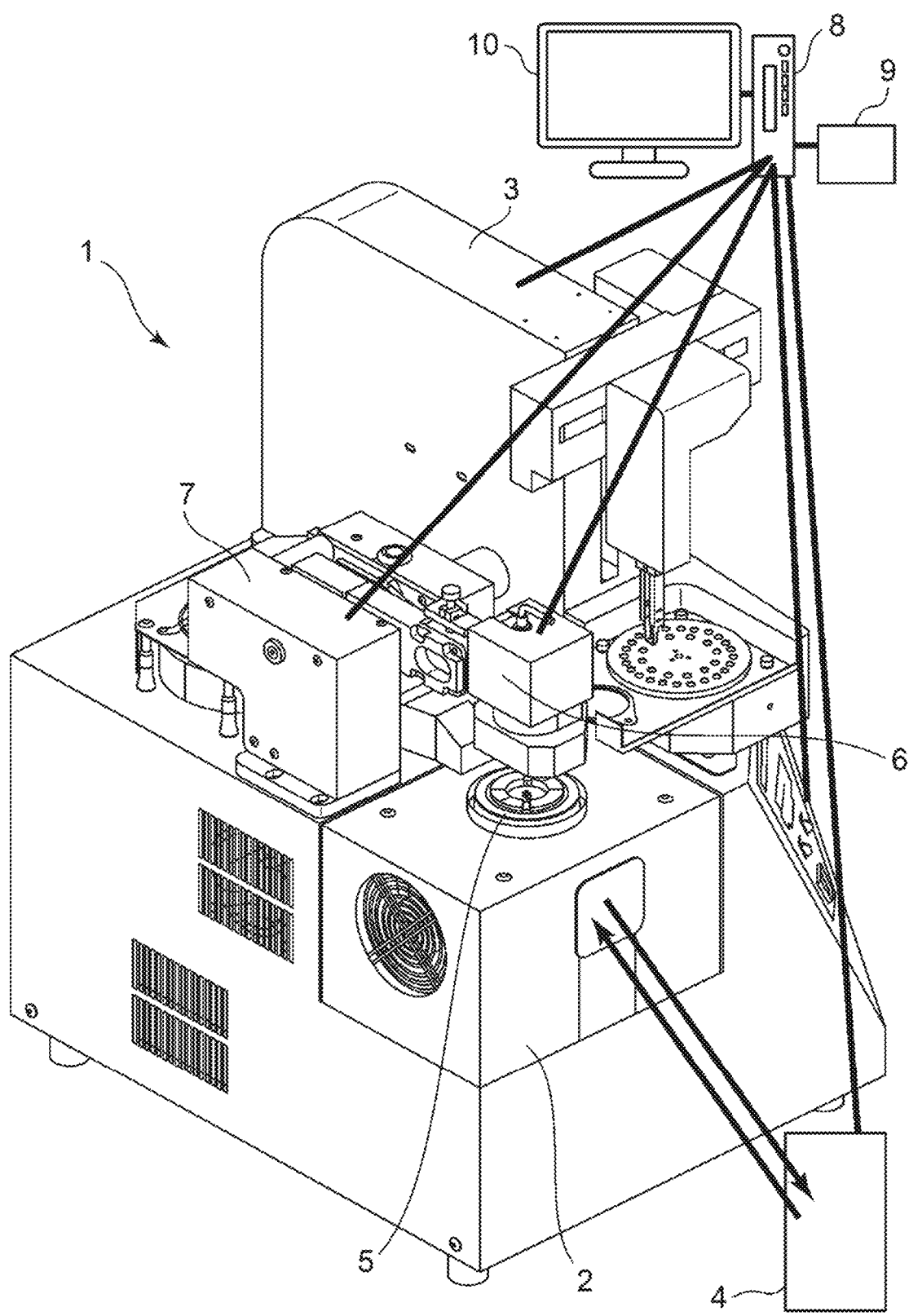
FIG. 1 is an external view showing general arrangement of a thermal analysis apparatus according to an embodiment of the present disclosure.

As a thermal analysis apparatus according to a first embodiment of the present disclosure, a differential scanning calorimetry (DSC) apparatus with a sample observation function is described. Referring to FIG. 1, a thermal analysis apparatus 1 includes a differential scanning calorimetry (DSC) apparatus 2, an automatic sample changer 3, a cooling unit 4, a lid unit 5 with observation windows, a camera 6, a camera moving mechanism 7, a computer 8, an input device 9, and a display 10. The computer 8 is installed with software 30 for controlling the thermal analysis apparatus 1, which will be described later.

Figure 2:
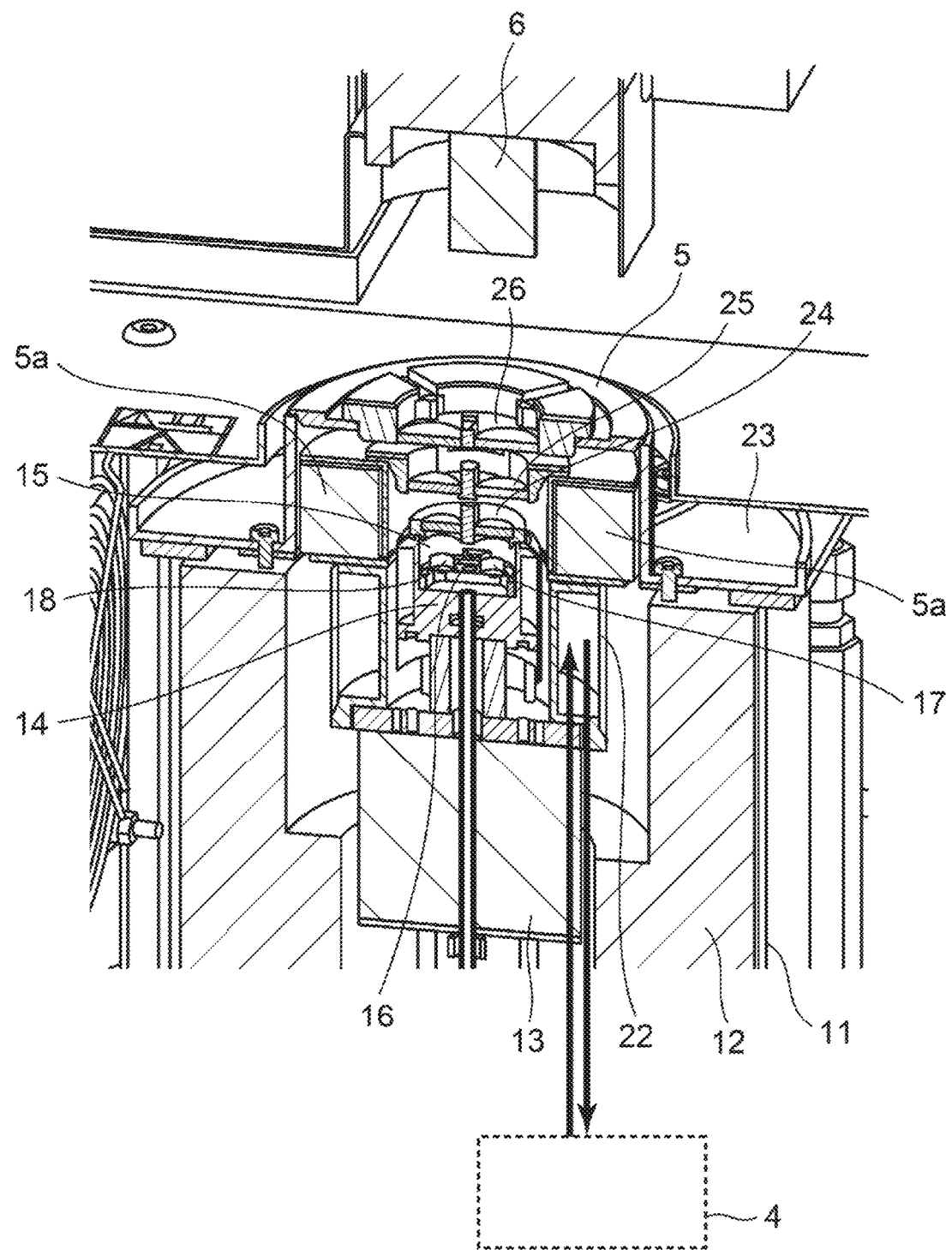
FIG. 2 is a cross-sectional view of a heating furnace and its surroundings of the thermal analysis apparatus, with hatching partially omitted.
Figure 3:
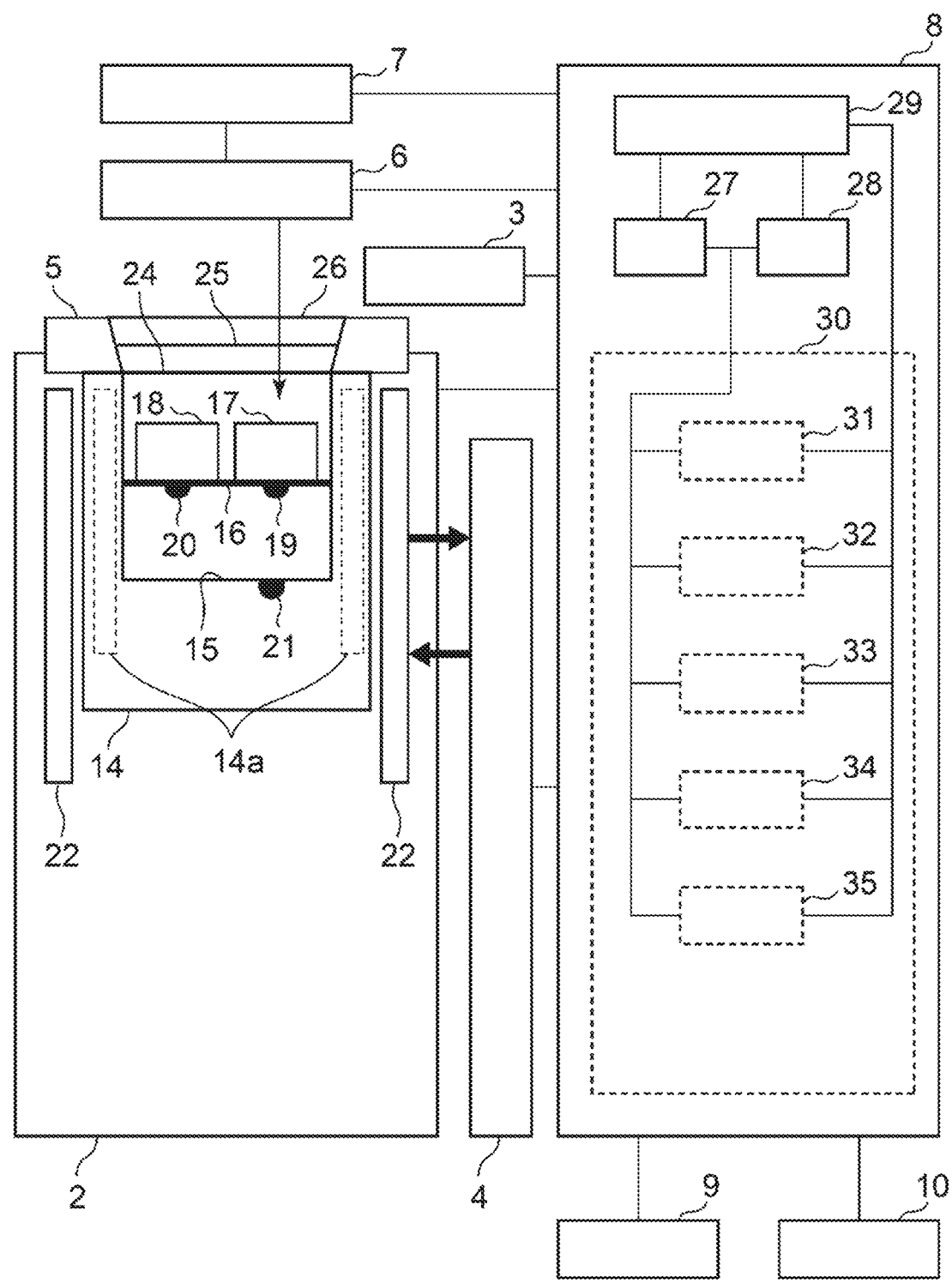
FIG. 3 is a block diagram showing the control and processing system of the thermal analysis apparatus.

Referring to FIG. 2, the DSC apparatus 2 has a heating furnace 14 surrounded on its sides and bottom by heat insulators 12 and 13 in a cylindrical case 11. The heating furnace 14 includes a measurement chamber 15 with an open top surface and a heat sensitive plate 16 provided inside the measurement chamber 15. A sample container 17 on which a sample is placed is arranged at a predetermined sample measurement position on the heat sensitive plate 16. A sample container 18 on which a reference material is placed is arranged at a predetermined reference material measurement position on the heat sensitive plate 16. Referring to FIG. 3, a heater 14a that generates heat when energized is provided in the side wall of the heating furnace 14. The heating furnace 14 heats the sample and reference material in the measurement chamber 15 when the heater 14a generates heat.

Referring to FIG. 3, a sample temperature detecting means 19 such as a thermocouple is provided at the predetermined sample measurement position of the heat sensitive plate 16 to detect the temperature in contact or proximity to a bottom of the sample container 17. A reference material temperature detecting means 20 such as a thermocouple is provided at the predetermined reference material measurement position of the heat sensitive plate 16 to detect the temperature in contact or proximity to a bottom of the sample container 18. A heating furnace temperature detecting means 21 such as a thermocouple is provided at a bottom of the measurement chamber 15 of the heating furnace 14 to detect the temperature of the heating furnace 14. The DSC apparatus 2 converts the temperatures detected by the sample temperature detecting means 19, the reference material temperature detecting means 20, and the heating furnace temperature detecting means 21 into a sample temperature signal, a reference material temperature signal, and a heating furnace temperature signal, respectively. The DSC apparatus 2 saves the signals in a storage unit provided in the DSC apparatus 2 and transmits the signals to the computer 8 by wireless or wired communication.

Referring to FIGS. 2 and 3, a refrigerant jacket 22 connected to the cooling unit 4 by two conduits is provided around the outer circumference of the heating furnace 14. The cooling unit 4 circulates a cooling medium such as liquid nitrogen between an inside of the coolant jacket 22 and the cooling unit 4 to cool the sample and the reference substance in the heating furnace 14 and the measurement chamber 15.

The lid unit 5 with observation windows is provided on a case lid 23, which closes an upper surface of the case 11. The lid unit 5 with observation windows has an inner lid 24 with an observation window that is removably attached to the heating furnace 14, a middle lid 25 with an observation window that is removably attached to a spacer 5a installed on the case lid 23, and an outer lid 26 with an observation window that is removably attached to the lid unit 5 so that the top opening of the measurement chamber 15 can be opened and closed. The reason for having three lids with observation windows is to prevent condensation from forming on the observation windows when they are cooled by the cooling unit 4, for example. When measuring, all lids 24, 25 and 26 with observation windows are attached to the lid unit 5 and the top opening of the measurement chamber 15 is closed.

The DSC apparatus 2 is a heat flux type differential scanning calorimetry system. Differential scanning calorimetry (DSC) is "a method of measuring the temperature of both a reference material and a sample while applying a constant heat, and quantitatively measuring the endotherm and exotherm due to changes in the state of the sample. The reference material is made of thermally stable material and does not change its physical properties such as melting and evaporation even if the temperature changes. In contrast, when the sample undergoes an endothermic or exothermic reaction in response to a temperature change according to its own characteristics, the temperature change stops during the reaction and a temperature difference $\Delta T$ is generated between the sample and the reference material. Heat flow to mitigate this temperature difference $\Delta T$ flows into the sample through the heat sensitive plate 16. Heat quantity per unit time (heat flow) that flows into the sample is proportional to the temperature difference $\Delta T$ between the sample and the reference material. Therefore, the heat quantity (energy) of the sample is obtained by integrating the temperature difference $\Delta T$ with respect to time, correcting the value in consideration of the temperature dependence, and dividing the corrected value by the apparatus constant K. In this way, the heat flux flowing into the sample, and thus the heat quantity, is calculated based on the temperature difference between the sample and the reference material. The calculated heat quantity is a thermal analysis data (DSC data) obtained by differential scanning calorimetry (DSC) of the sample.

Referring to FIGS. 1 to 3, the camera 6 captures images of the sample on the sample container 17 arranged at the predetermined sample measurement position in the measurement chamber 15 through the observation windows of the three lids 24, 25 and 26 of the lid unit 5. The image data of the sample taken by the camera 6 is stored in the memory unit provided in the camera 6 or the camera moving mechanism 7 and is also transmitted to the computer 8.

The camera moving mechanism 7 adjusts the position of the sample to be photographed by the camera 6. When the lids 24, 25 and 26 with observation windows are removed from the lid unit 5 and the sample or reference material is placed or replaced in the measurement chamber 15, the camera 6 pivotally supported by the camera moving mechanism 7 on a horizontal axis rotates upward and backward and retreats from an area around the lid unit 5.

The automatic sample changer 3 is activated when the camera 6 pivotally supported by the camera moving mechanism 7 rotates upward and backward and retreats and the lids 24, 25 and 26 with observation windows are removed from the lid unit 5. The sample changer 3 can make the sample container 17 carrying the sample to be placed at or removed from the predetermined sample measurement position through the top opening of the measurement chamber 15. The automatic sample changer 3 may further be capable to make the sample container 18 carrying the reference material to be placed at or removed from the predetermined reference material measurement position.

Referring to FIG. 3, the computer 8 is installed with the control software 30 for the thermal analysis apparatus according to an embodiment of the present disclosure. The computer 8 includes a central processing unit (CPU) 27, a graphic processing unit (GPU) 28, a memory device 29 such as HDD, SSD and the like. The computer 8 transmits and receives various signals through wired or wireless communication with the DSC apparatus 2, the automatic sample changer 3, the cooling unit 4, the camera 6, the camera moving mechanism 7, the input device 9, and the display 10.

The input device 9 is a device for the operator to input sample measurement conditions and operating instructions for each device into the computer 8. The input device 9 consists of a keyboard and mouse, but may also include a touch panel and voice input means.

The display 10 displays various types of information according to control by the software 30 installed in the computer 8 or input from the input device 9. The display 10 consists of a liquid crystal monitor or the like.

The thermal analysis apparatus 1 is controlled by the computer 8 with the software 30 installed, heats the sample by the heating furnace 14 or cools it by the cooling unit 4 to change the temperature of the sample in the measurement chamber 15, while measuring and calculating the physical properties of the sample to obtain thermal analysis data, and captures images of the sample with the camera 6 to obtain image data.

The computer 8 installed with the software 30 has a configuration and functions as thermal analysis graph display means 31 for displaying a graph of the thermal analysis data related to temperature or time on the display 10.

The computer 8 installed with the software 30 has a configuration and functions as sample image display means 32 for displaying a sample image of the image data on the display 10.

The computer 8 installed with the software 30 has a configuration and functions as color information generating means 33 for generating a color information data of the range and type selected from the sample image.

The computer 8 installed with the software 30 has a configuration and functions as color information graph display means 34 for displaying a graph of the color information data relating to temperature or time side by side with the graph of the thermal analysis data relating to temperature or time without superimposing both graphs on the display 10.

The computer 8 installed with the software 30 has a configuration and functions as marker display means 35 for displaying a marker at an arbitrary point on one of the graphs and displaying a marker on others of the graphs at a point whose measurement time is synchronized with the point where the marker is displayed.

Figure 4:
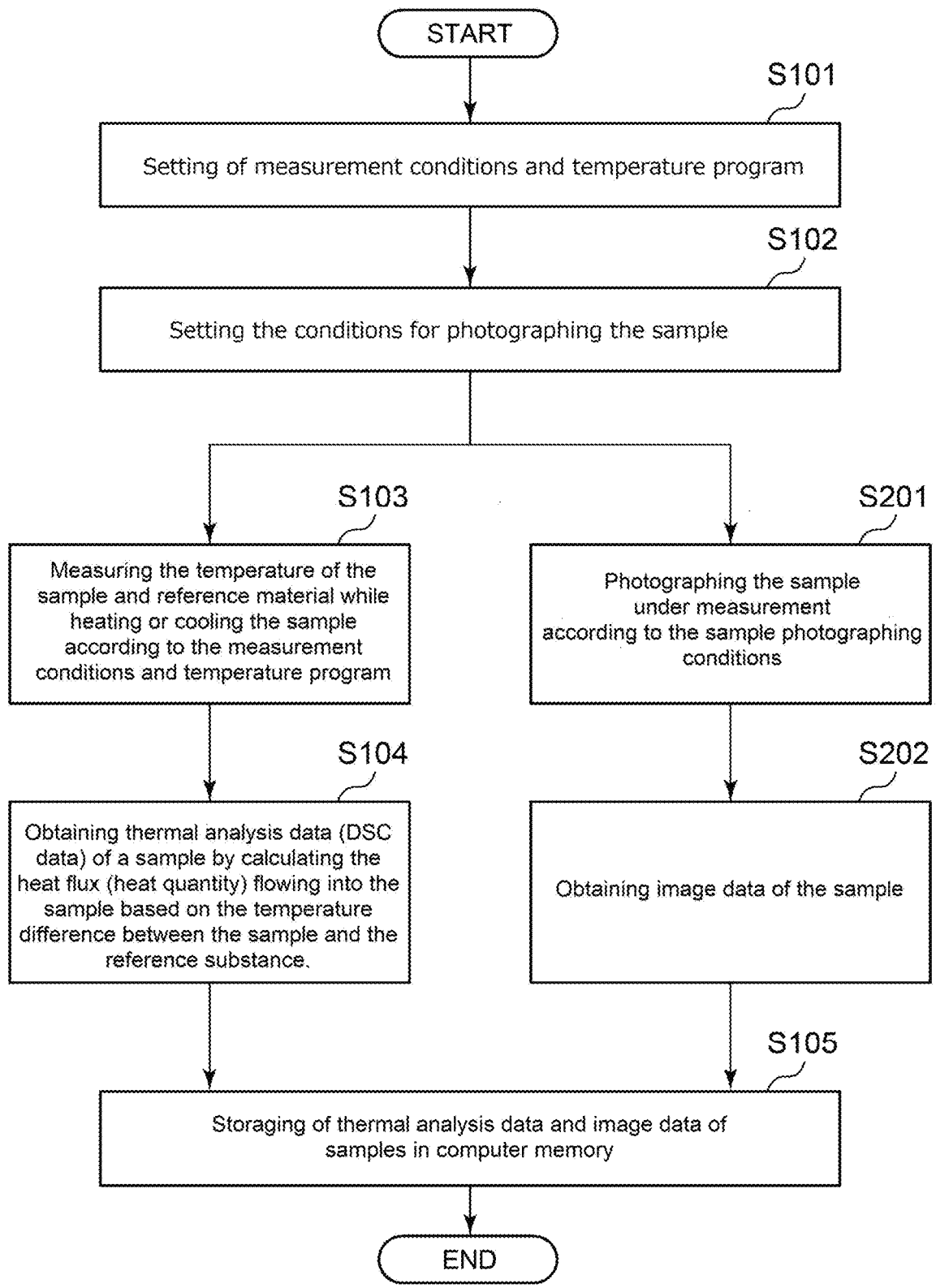
FIG. 4 is an example of a flowchart for acquiring thermal analysis data and image data by the thermal analysis apparatus.

Referring to FIG. 4, the following description relates to an example of a flowchart for acquiring thermal analysis data and image data of a sample using the thermal analysis apparatus according to an embodiment of the present disclosure.

In step S101, a measurement condition and temperature program setting screen of the thermal analysis apparatus 1 is opened, and a sample name, sample weight, set temperature range, measurement time, measurement interval, etc. are set by inputting them into the computer 8 using the input device 9.

In step S102, a sample imaging condition setting screen of the thermal analysis apparatus 1 is opened, and imaging time, imaging interval, etc. are set by inputting them into the computer 8 using the input device 9.

In step S103, the measurement is started, and the temperature is controlled by the computer 8 with the software 30 installed according to the predetermined measurement conditions and the predetermined temperature program. Specifically, the heater 14a is energized to generate heat, and the heating furnace 14 heats the sample placed on the sample container 17 arranged at the predetermined sample measurement position in the measurement chamber 15. Alternatively, the cooling unit 4 circulates a cooling medium to and from the inside of the refrigerant jacket 22 through two conduits to cool the furnace 14 and the sample placed on the sample container 17 placed at the predetermined sample measurement position in the measurement chamber 15. Then, the sample temperature detecting means 19 measures the temperature of the sample and the reference material temperature detecting means 20 measures the temperature of the reference material, according to predetermined measurement conditions such as measurement intervals.

In step S104, computer 8 calculates the heat flux, or heat quantity, flowing into the sample based on the temperature difference between the measured sample temperature and the reference material temperature to obtain thermal analysis data (DSC data) for the sample.

In step S201, photographing is performed under the control of the computer 8 installed with the software 30 according to predetermined sample photographing conditions. Specifically, the camera 6 of the thermal analysis apparatus 1 photographs the sample placed on the sample container 17 arranged at the predetermined sample measurement position in the measurement chamber 15 during the measurement.

In step S202, the computer 8 obtains image data of the sample being measured.

In step S105, the thermal analysis data and the image data of the sample acquired by the computer 8 are stored in the memory device 29 of the computer 8.

The following description relates to an example of a flowchart for displaying graphs of thermal analysis data and image data using the thermal analysis apparatus according to an embodiment of the present disclosure in order to analyze state changes associated with temperature changes of the sample.

Figure 5:
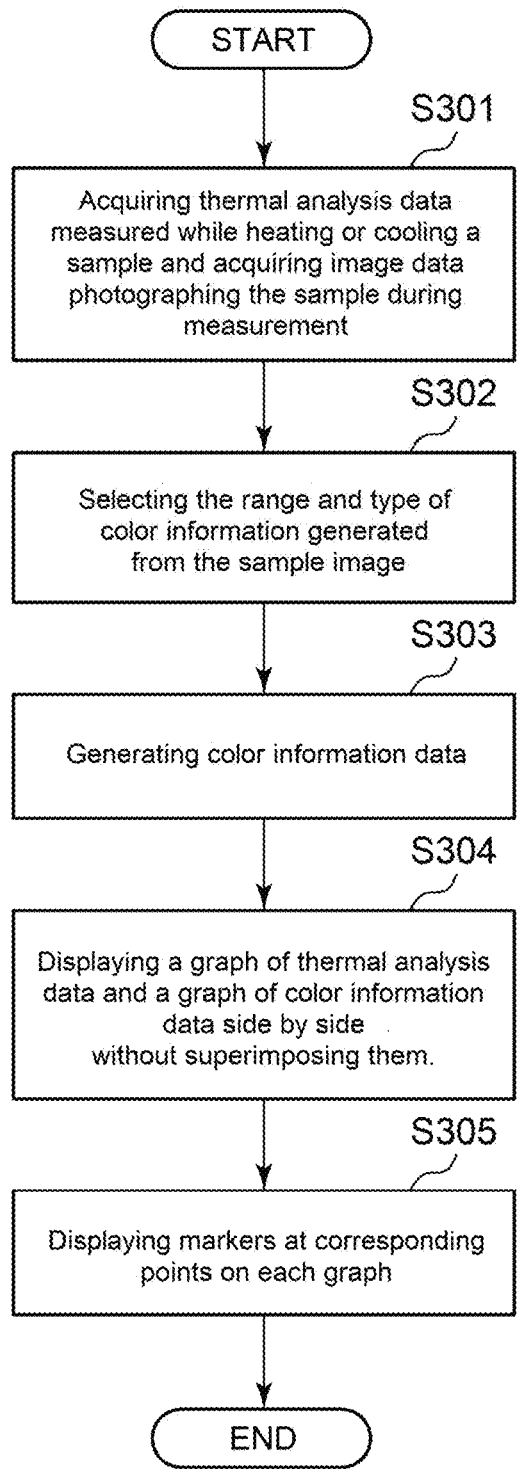
FIG. 5 is an example of a flowchart for displaying thermal analysis data, image data, etc. in a graph, etc. by the thermal analysis apparatus.

Referring to FIG. 5, in step S301, the thermal analysis apparatus 1, which is controlled by the computer 8 with the software 30 installed, measures and calculates the physical properties of the sample in the measurement chamber 15, while changing the temperature of the sample by heating it with the heating furnace 14 or cooling it with the cooling unit 4, so as to obtain thermal analysis data, and photographs the sample with the camera 6 during the measurement to obtain image data. For example, the sample can be measured and photographed according to the flowchart shown in FIG. 4 to obtain thermal analysis data and image data. The thermal analysis data and image data may also be acquired by reading the data stored in the memory device 29 of the computer 8.

Figure 6:
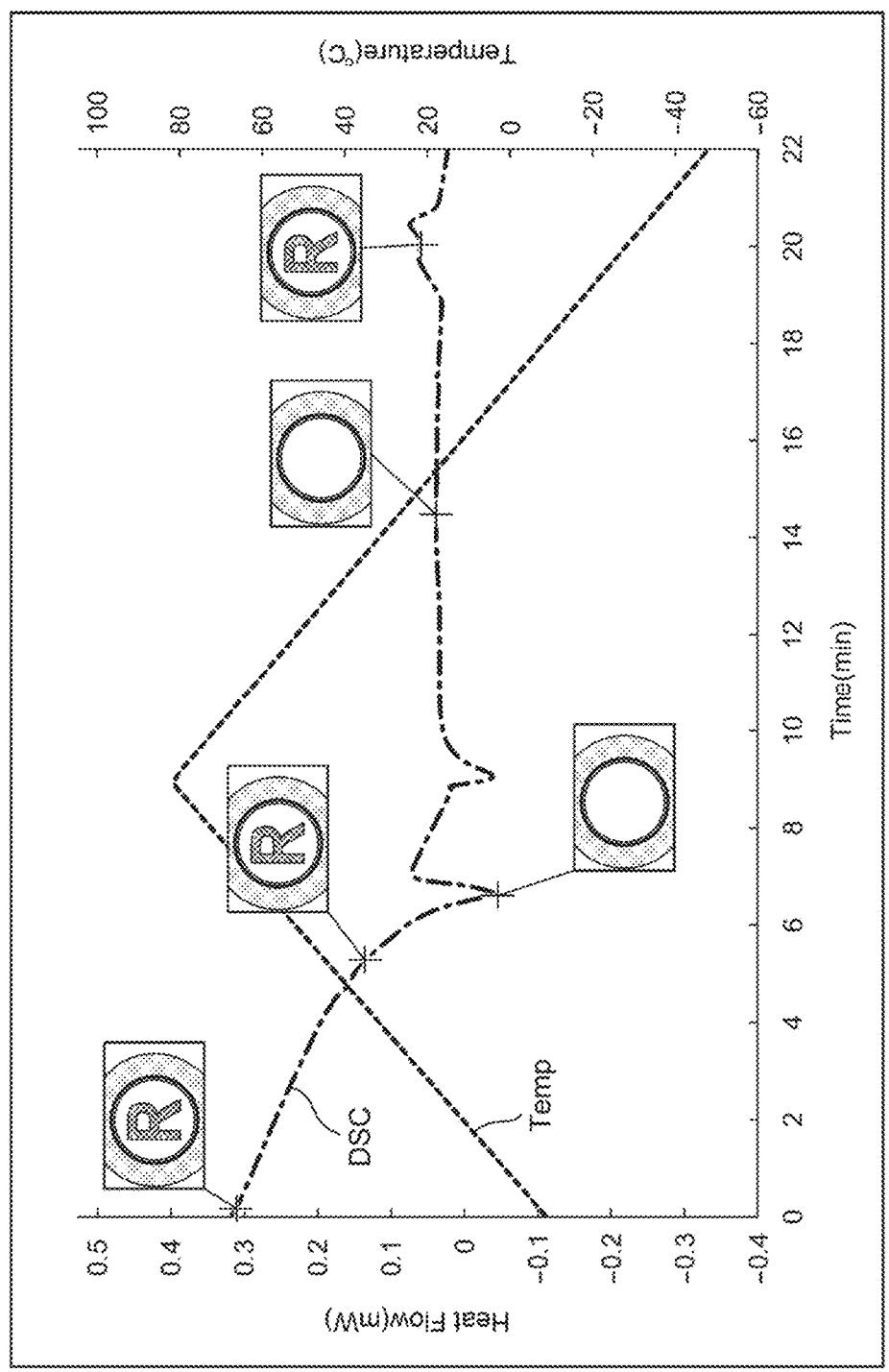
FIG. 6 is a graph of thermal analysis data (DSC data) and sample images of the desired points on the graph, displayed by the thermal analysis apparatus.

FIG. 6 shows an example of a graph of DSC data obtained by measuring the temperature of a sample and the temperature of a reference material in the process of raising the temperature of the sample to 80° C. and then lowering it to −50° C., and then calculating based on the temperature difference between the sample and the reference material. Specifically, a graph of the sample related to temperature and time is displayed by the thermal analysis graph display means 31, with the horizontal axis representing time (Time; unit: minutes (min).) and the vertical axis representing temperature (Temperature; unit: ° C.). A graph of the sample related to heat flow and time is also displayed with the horizontal axis representing time (Time, unit min.) and the vertical axis representing heat flow (Heat Flow, unit: milliwatt (mW)).

In FIG. 6, the sample image display means 32 displays a sample image of an arbitrarily selected point on a graph of heat analysis data (DSC data) with respect to heat flow and time. The sample image display means 32 can display multiple sample images on the display 10 by selecting multiple points on the graph of the thermal analysis data or by selecting multiple sample images from the image data stored in the memory device 29.

Figure 7:
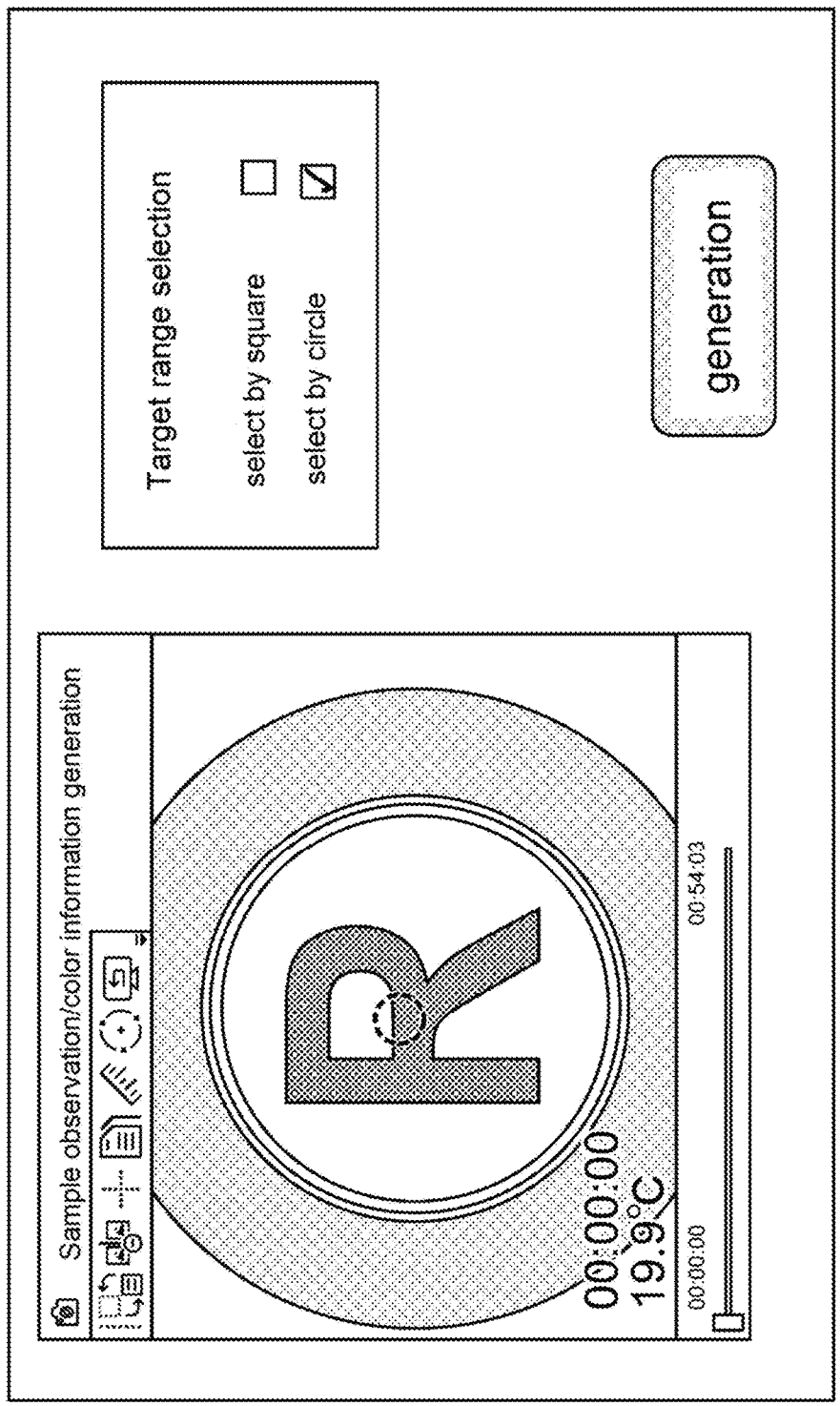
FIG. 7 is a diagram showing a screen for selecting a range for generating color information data from a sample image by a color information generation means of the thermal analysis apparatus.

Referring to FIG. 5, in step S302, the color information generating means 33 can select the range and type of color information to be generated from the sample image. FIG. 7 shows an example of a sample observation color information window opened by the color information generating means 33 for selecting the range and type of color information to be generated from the sample image. The sample image is displayed in the sample observation color information window by the sample image display means 32. In the sample observation color information window shown in FIG. 7, there is a check box to select whether to "select by square" or "select by circle" as the range of color information to be generated from the sample image (target range). In FIG. 7. "Select by circle" is checked, so a dashed circle is displayed in the sample image displayed in the sample observation color information window. The size and position of the target area indicated by the dashed circle can be changed using an input device 9 such as a keyboard or mouse.

Additionally, there is also a sample observation color information window for selecting the type of color information to be generated. The color information is information that quantifies the color of the image data captured by the camera 6. The types of color information to be generated can be selected from, for example: "RGB" that expresses colors by combining the "three primary colors of light (Red, Green, and Blue)"; "CMYK" that expresses colors by combining the "three primary colors of color (Cyan, Magenta, and Yellow)" and "black"; "CIE Lab" that is defined by the International Commission on Illumination (CIE); and "HSV" that expresses colors by combining "Hue, Saturation, and Value".

Referring to FIG. 5, in step S303, the color information generating means 33 generates color information data for the range and type selected from the sample image. Referring to FIG. 7, when "Generate" displayed in the sample observation color information window is clicked with the mouse, the color information generating means 33 confirms the selection of the range and type of color information to be generated and generates color information data. FIG. 8 shows an example of color information data generated by the color information generating means 33 in a table. As shown in FIG. 8, thermal analysis data (Temp, DSC), image data (observed image), and color information data (R-values, G-values, B-values, etc.) are stored in correspondence with the measurement time (Time).

Figure 9:
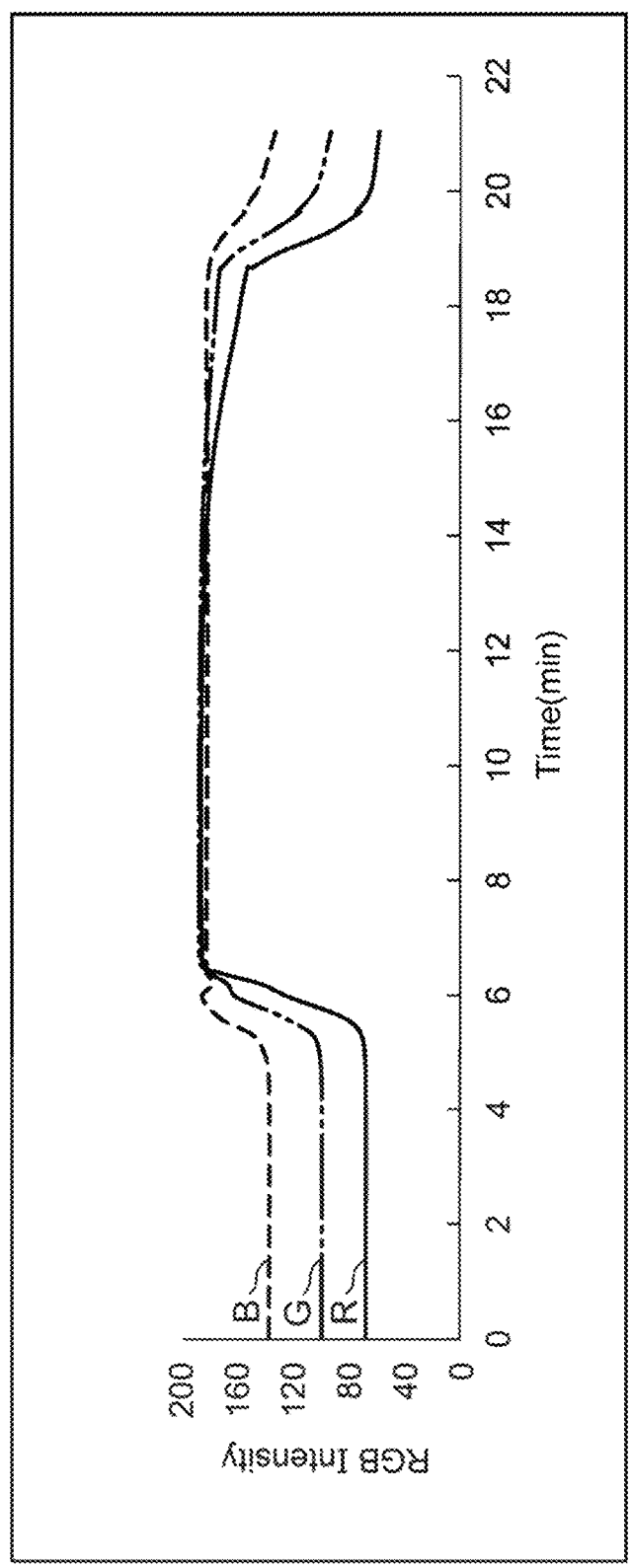
FIG. 9 is a diagram showing color information graphs displayed by a color information graph display means of the thermal analysis apparatus.

FIG. 9 shows graphs of the color information data shown in the table in FIG. 8. R-values, G-values, and B-values, with the horizontal axis representing time. According to these graphs of color information, it can be understood that the color information changes significantly between 5 and 7 minutes after the start of measurement and between 14 and 20 minutes (especially around 19 minutes). Thus, according to the graphs of color information, it is possible to accurately grasp the timing and amount of color change of the samples. However, the graph of color information in FIG. 9 does not allow us to visually grasp the color of the sample and its change. In addition, the relationship with the sample temperature cannot be grasped.

Referring to FIG. 5, in step S304, the thermal analysis graph display means 31 displays a graph of the thermal analysis data related to temperature or time on the display 10. In addition, the color information graph display means 34 displays a graph of the color information data related to the temperature or time on the display 10 side by side with the graph of the thermal analysis data related to the temperature or time without superimposing them.

Referring to FIG. 5, in step S305, the marker display means 36 selects an arbitrary point on one of the graphs and displays a marker on the selected point, as well as on points on other ones of the graphs whose measurement time is synchronized with that of the point on which the marker is displayed.

The graph of the thermal analysis data and the graph of the color information data are displayed side by side without superimposition, making each graph easier to see and analyze. Furthermore, markers are displayed at corresponding points on the graphs of thermal analysis data and color information data, making it easy to grasp the correspondence between thermal analysis data and color information data. Therefore, each graph can be analyzed to evaluate in detail the state changes accompanying temperature changes in the sample.

Figure 10:
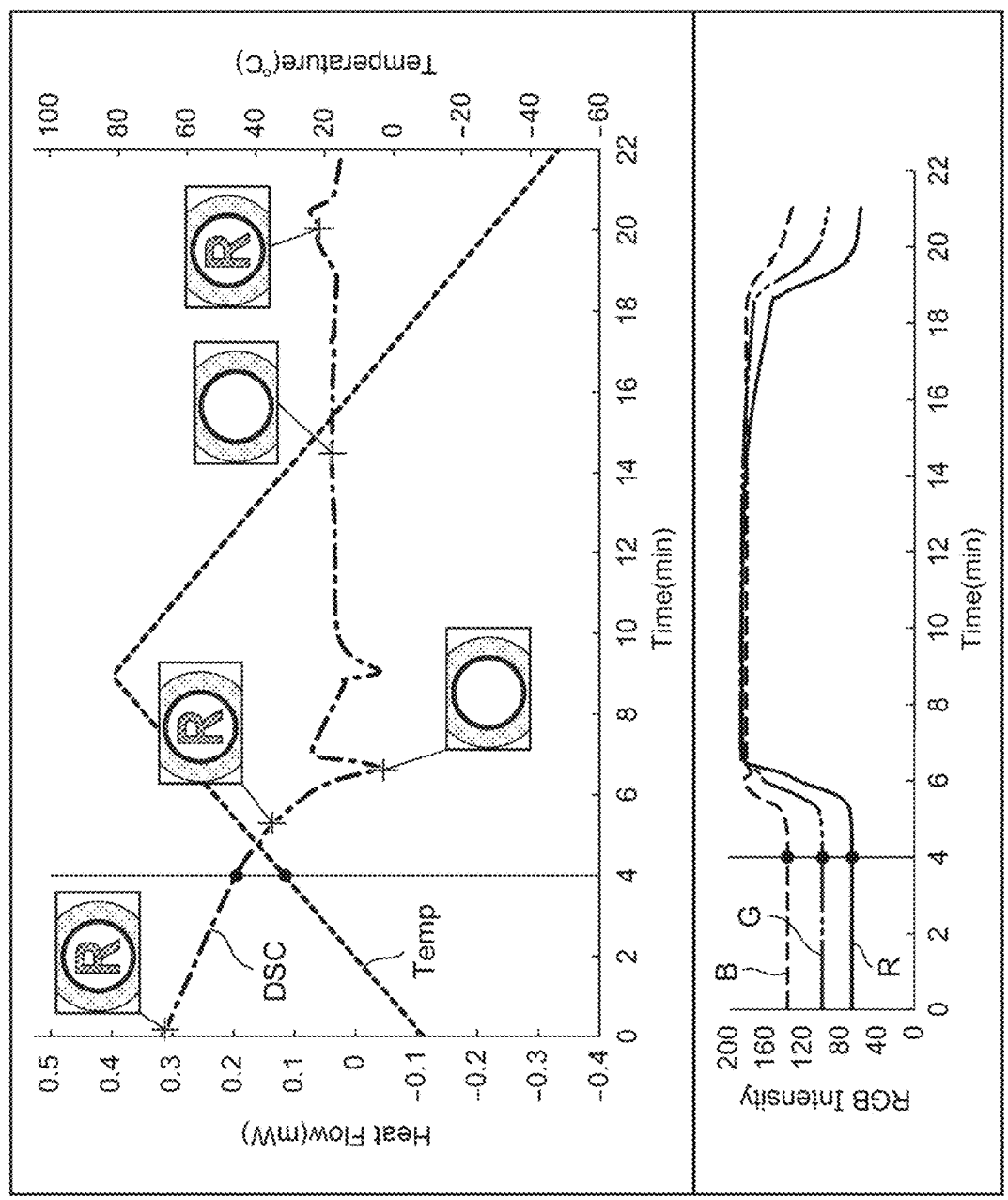
FIG. 10 is a diagram showing a graph of thermal analysis data, a sample image of the desired point on the graph, and a graph of color information data displayed by the thermal analysis apparatus.

For example, FIG. 10 shows a graph of thermal analysis data (DSC data) measured by the thermal analysis apparatus 1 when paper on which letters were written with an erasable ballpoint pen was placed in the sample container and the temperature was increased at 10° C./min to 80° C. in an N2 atmosphere and then decreased to −50° C., with the horizontal axis representing time (measurement time). A graph (Temp) showing the relationship between time (measurement time) and sample temperature is also displayed.

FIG. 10 displays a graph of the thermal analysis data (DSC data) as well as sample images at five points on the graph of the thermal analysis data (DSC data). Although the display of sample images allows the user to grasp the actual color of the sample, it is difficult to evaluate local color changes of the sample or to compare and evaluate color changes at multiple locations due to the limited number of sample images that can be displayed.

In FIG. 10, a graph of the color information data (RGB values) generated from the character portion near the center of the sample image is displayed below the graph of the thermal analysis data (DSC data) without superimposition, with the horizontal axis representing the time from the start of measurement and the scale size also matching. The graph of color information data (RGB values) generated from the character area near the center of the sample image is displayed side by side with the graph of thermal analysis data (DSC data) shown above. The graph of color information data (RGB values) allows the timing and amount of color change to be understood. Since the graph of thermal analysis data and the graph of color information data are displayed side by side without superimposition, each graph becomes easier to see and analyze.

In FIG. 10, circled markers are displayed at the points on the graphs of the two thermal analysis data and the three color information data that correspond to a time (measurement time) of 4 minutes. Since the markers are displayed at the corresponding points on each graph, the corresponding relationship between the thermal analysis data and the color information data can be easily grasped. For example, it can be understood that the sample temperature of the point indicated with a marker in the graph of color information data is the sample temperature corresponding to the marker displayed in the graph of sample temperature of thermal analysis data. In this way, since the graph of the thermal analysis data (DSC data) and the graph of the color information data are displayed side by side without superimposition, the graph of the thermal analysis data and the graph of the color information data are easy to see and analyze. Since the markers are displayed at the corresponding points on each graph, it is possible to analyze changes in the state of the sample in detail, while grasping and relating the color changes of the sample in detail as the temperature of the sample changes. Furthermore, the vertical axis (intensity of color information data) and horizontal axis (time, temperature, etc.) values may be displayed near the markers to facilitate adjustment of the marker positions.

Furthermore, the marker display means 36 may have a configuration and functionality that enables it to move markers displayed on other graphs in response to moving a marker displayed on one graph. For example, in FIG. 10, according to the marker display means 36, when the cursor position of the mouse, which is an input device, is aligned with a marker displayed on one of the graphs, and then the marker is moved on the graph with the mouse, so that each marker displayed on the other graphs may also be made to move on each graph. With such a configuration and function, moving the markers enables detailed evaluation of the state change accompanying temperature change of the sample while easily grasping the correspondence between the thermal analysis data and the color information data.

Figure 11:
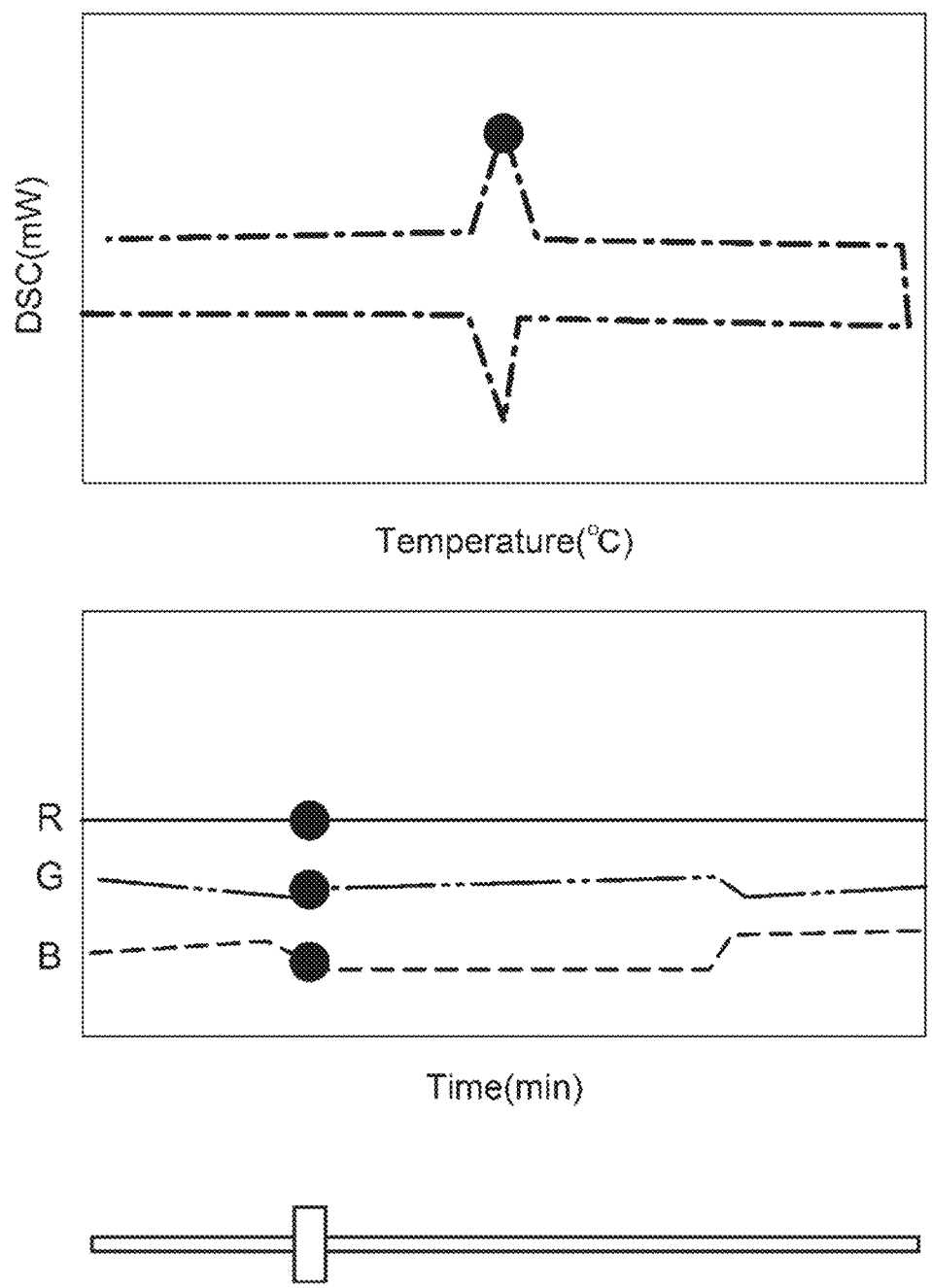
FIG. 11 is a diagram showing examples of a marker and a slider bar displayed by a marker display means of the thermal analysis apparatus.

Referring to FIG. 11, the following description relates to an example of a graph of thermal analysis data and a graph of color information data is shown with the horizontal axis representing different variables. The graph of DSC data displayed on the upper side of FIG. 11 has temperature on the horizontal axis. The graph of DSC data measured and acquired in the process of increasing and then decreasing the temperature is generally displayed with temperature as the horizontal axis and the graph during temperature increase and the graph during temperature decrease arranged vertically side by side. Since the baseline of the DSC data depends on the heat capacity of the sample, the graph during heating shifts downward and the graph during cooling shifts upward, so the two graphs do not overlap. On the other hand, each graph of the RBG color information, which is displayed side by side below the graph of DSC data in FIG. 11 without superimposition, has time on the horizontal axis. This is because when the RGB graphs are displayed with temperature as the horizontal axis, the graphs for the temperature rise and the graph for the temperature fall overlap, making analysis difficult.

When a graph of thermal analysis data and a graph of color information data are displayed with different variables on the horizontal axis, it is difficult to grasp the corresponding relationship between the two graphs. Therefore, as shown in FIG. 11, markers are displayed at corresponding points on each graph (e.g., points with the same measurement time) by the marker display means. By displaying markers at corresponding points on each graph, the correspondence relationship between the graphs of thermal analysis data and those of color information data can be easily grasped. Furthermore, if the marker display means 36 has a configuration and function that allows the marker displayed on one graph to be moved in correspondence with the marker displayed on another graph, the user can easily grasp the correspondence between the thermal analysis data and the color information data by moving the marker. By moving the markers, it is possible to easily grasp the correspondence between the thermal analysis data and the color information data, and to evaluate the state change of the sample in detail as the sample changes in temperature.

Furthermore, the marker display means 36 may have a configuration and function to move the marker displayed on the graph in response to selecting values within a predetermined temperature or time range with a slider bar. For example, FIG. 11 shows an example of a slider bar that allows selection of values within a predetermined time range below a graph of color information data. A marker is displayed at each point on the thermal analysis graph and the color information graph corresponding to the time corresponding to the position of the rectangular knob on the slider bar. The marker moves on each graph in correspondence with moving the slider bar knob to the left or right. This makes it easier to move the markers, and it is easier to grasp the correspondence between the thermal analysis data and the color information data, and to evaluate in detail the state change accompanying the temperature change of the sample. Furthermore, to facilitate adjustment of the slider bar knob position, the vertical axis (intensity of the color information data) and horizontal axis (time, temperature, etc.) values corresponding to the knob position may be displayed near the slider bar.

Figure 12:
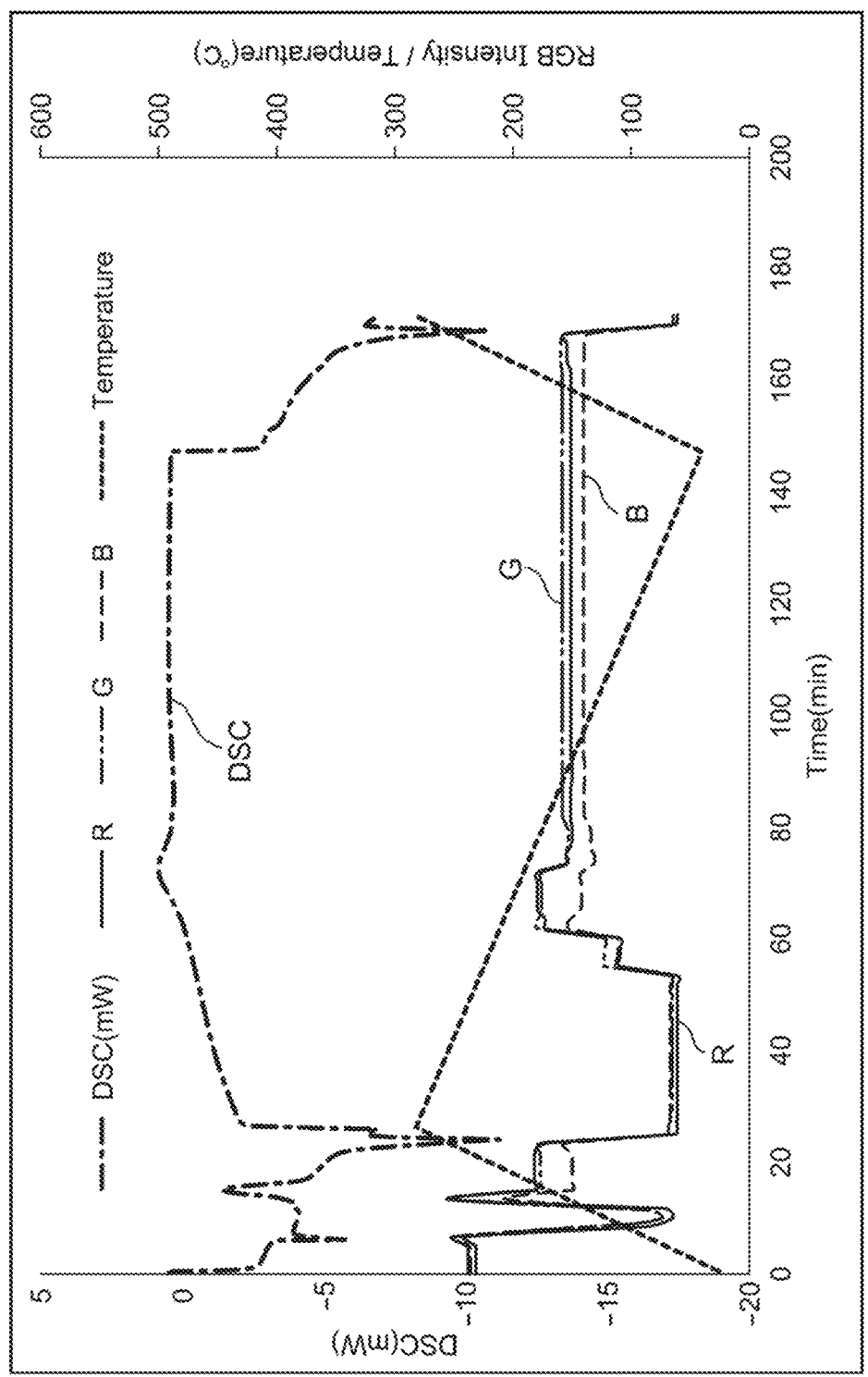
FIG. 12 is a diagram of Comparative Example 1 showing a graph of DSC data and graphs of color information data superimposed on each other with time as a horizontal axis.
Figure 13:
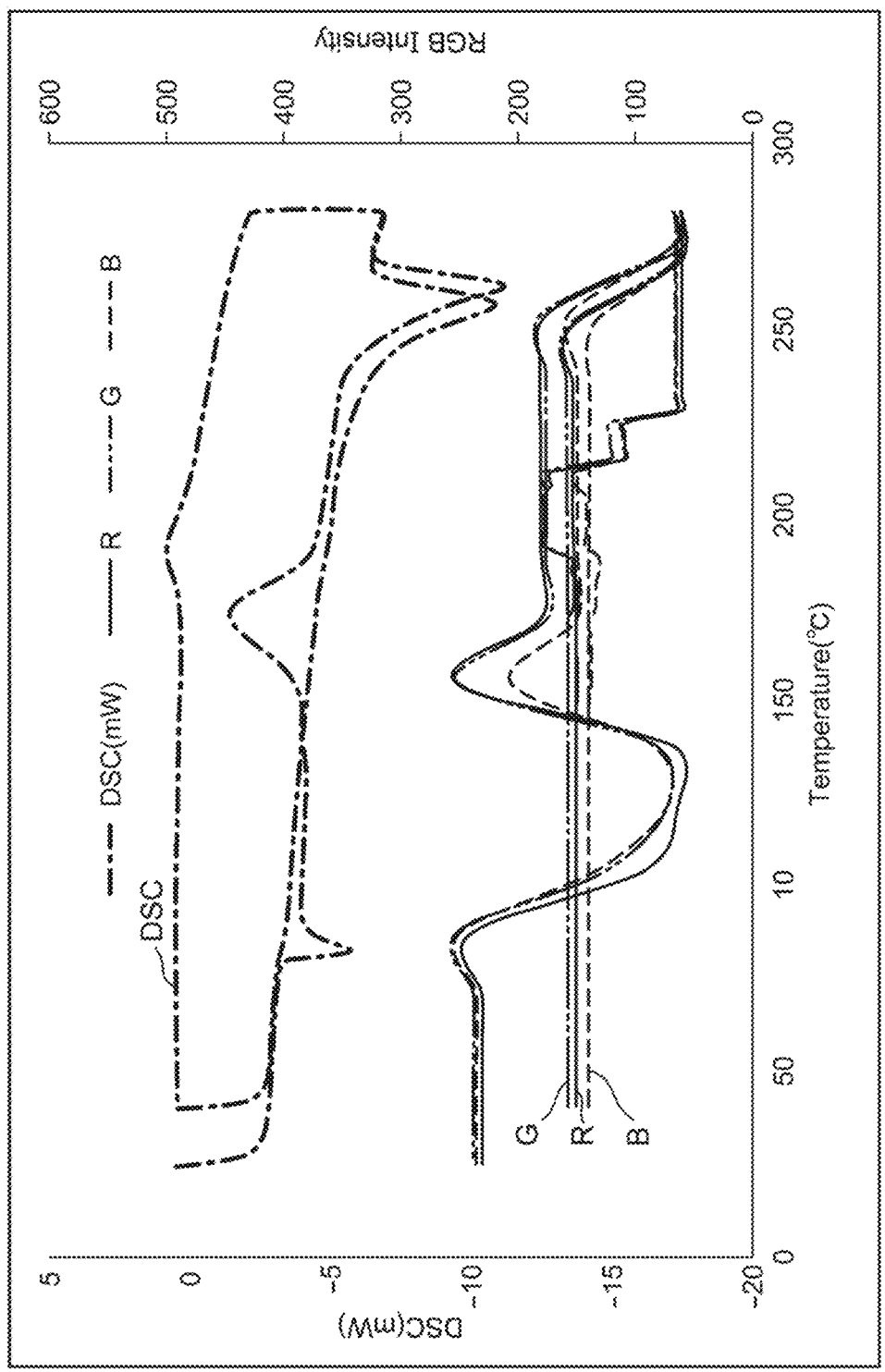
FIG. 13 is a diagram of Comparative Example 2 showing a graph of DSC data and graphs of color information data superimposed on each other with temperature as a horizontal axis.
Figure 14:
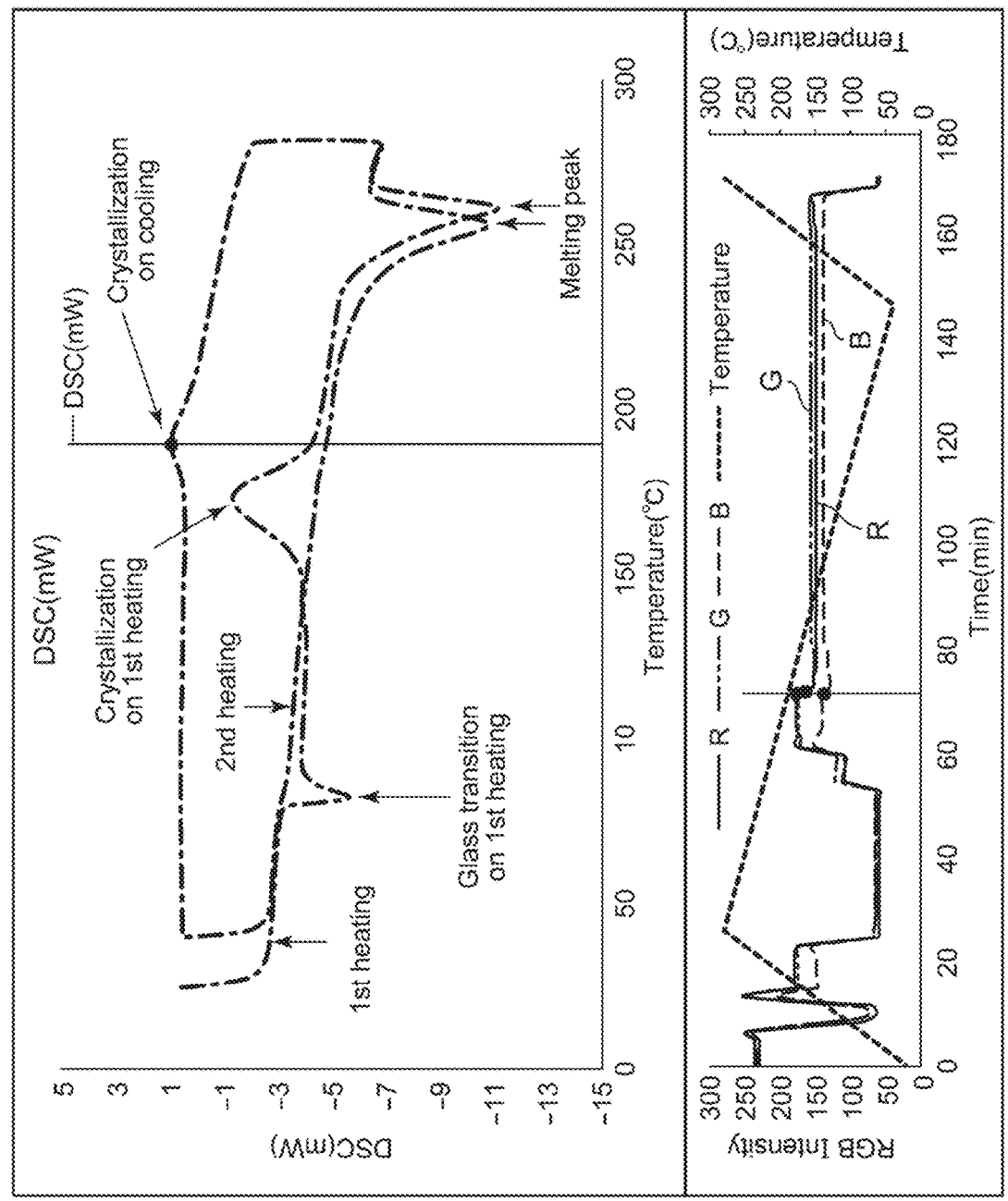
FIG. 14 is a diagram showing a graph of DSC data and a graph of color information data displayed by the thermal analysis apparatus according to the embodiment of the present disclosure.

Next, a graph display method by the thermal analysis apparatus according to an embodiment of the present disclosure shown in FIG. 14 is described in comparison with graph display methods by comparative examples shown in FIGS. 12 and 13. The DSC data shown in FIGS. 12 to 14 are the same, and were measured and obtained in a process of the temperature of the PET up to 300° C., then down to 40° C. and up to 300° C. again. The color information data shown in FIGS. 12 to 14 are the same, and are color information data (RGB values) generated by selecting a range near the center of the sample image from the PET image data photographed synchronously with the above measurements.

FIG. 12 shows Comparative Example 1 in which a graph of DSC data (DSC, unit: mW), a graph of three color information data (R value, G value, B value), and a graph of sample temperature (Temperature; unit: ° C.) are superimposed and displayed with the horizontal axis as time (Time; unit: min.). FIG. 13 shows Comparative Example 2 in which a graph of DSC data and a graph of three color information data are superimposed and displayed with the horizontal axis as temperature. FIG. 14 shows a graph display method by the thermal analysis apparatus according to an embodiment of the present disclosure, in which a graph of DSC data with temperature on the horizontal axis and three graphs of color information data with time on the horizontal axis are displayed vertically side by side without superimposition. A graph of sample temperature is also shown in the graph of color information.

As shown in FIG. 14, according to the present disclosure, in the graph of DSC data with temperature on the horizontal axis, the graph during the first temperature increase, the graph during the first temperature decrease, and the graph during the second temperature increase are displayed in an overlapping manner. Therefore, it can be easily understood that glass transition, crystallization, and melting reaction can be observed in the first graph, while only melting reaction can be observed in the second graph. The three color information data graphs overlap each other, but they do not overlap the DSC data graph, so analysis is not difficult. Furthermore, since markers are displayed at corresponding points on the DSC data and the three color information data, the correspondence between the two can be easily grasped. Therefore, the thermal analysis data and the color information data can be compared and evaluated while the correspondence is easily grasped, and the state change accompanying the temperature change of the sample can be evaluated in detail. Furthermore, if the position of each displayed marker can be moved by moving the mouse cursor or slider bar, it is even easier to compare and evaluate the thermal analysis data and color information data while understanding the correspondence between them.

In contrast, according to the graph of Comparative Example 1 shown in FIG. 12, the graph of DSC data is displayed with the horizontal axis as time, making it difficult to compare and evaluate the graph at the first temperature increase, the graph at the first temperature decrease, and the graph at the second temperature increase. In addition, since the graph of DSC data, the graph of three color information, and the graph of sample temperature are superimposed and displayed, it is difficult to analyze and compare and evaluate each graph in detail.

According to the graph of Comparative Example 2 shown in FIG. 13, the graphs of the three color information data are difficult to analyze because the graphs at the first temperature rise, the graph at the first temperature fall, and the graph at the second temperature rise overlap. It is also difficult to compare and evaluate these graphs to evaluate in detail the changes in the state of the sample as the temperature rises, because it is difficult to determine the correspondence between the graph of the DSC data and the graph of the color information.

Furthermore, the computer 8 with the software 30 installed may be configured and function as a gradation display means for displaying on display 10 a gradation of colors generated from the color information data and arranged in correspondence with temperature or time. In FIG. 15, the colors generated by the gradation display means from the R, G and B values of the color information data shown in FIG. 8 are displayed in the "Color" column. As shown in FIG. 15, the thermal analysis data, image data, color information (R, G, and B values), and generated color are tied to the measurement time and the temperature of the sample at that time. Therefore, according to the generated colors, the color of the sample corresponding to each measurement time and sample temperature can be visually grasped.

Figure 16:
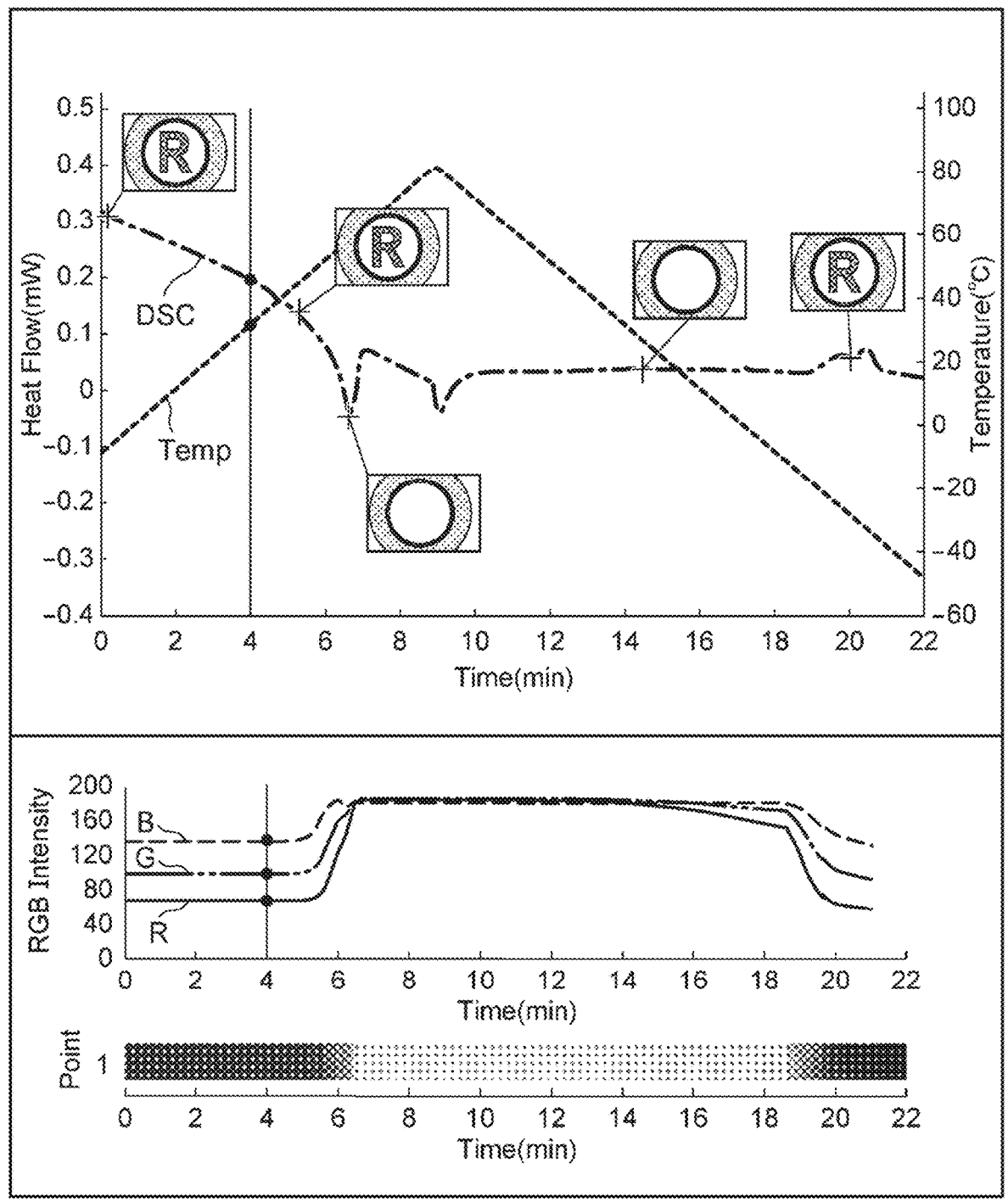
FIG. 16 is a diagram showing an example of a color gradation arranged below the graphs shown in FIG. 10 without being superimposed.

FIG. 16 shows a gradation (color bar) in which colors generated from the color information data (RGB values) are arranged side by side, with the horizontal axis representing the time from the start of measurement and the size of the scale as well, below the graph of thermal analysis data (DSC data) and color information data (RGB values) displayed in FIG. 10. Since the display of sample images is limited in the number of sample images that can be displayed, it is difficult to evaluate color changes in a localized area or to compare and evaluate color changes in multiple areas. A graph of color information data (RGB values) can evaluate the locations where color information changes, but cannot visually grasp the actual color or color change of a sample. In contrast, according to a gradation (color bar) in which colors generated from the color information data (RGB values) are arranged side by side, it is possible to grasp in detail where the color of the sample changes, and it is easy to visually grasp the actual color or color change of the sample. Therefore, by displaying a graph of the thermal analysis data as well as a gradation (color bar) of the color change of the sample, it is possible to evaluate in detail the change in state of the sample with temperature change.

Second Embodiment

As a thermal analysis apparatus according to an embodiment of the present disclosure, a TG-DTA apparatus with a sample observation function is described. Thermogravimetry (TG) is defined as "a method of measuring the mass of a sample as a function of temperature while the sample is varied according to a fixed program". Differential thermal analysis (DTA) is defined as "a method of detecting the temperature difference between a sample and a reference sample by detecting the thermal changes that occur in the sample as a result of physical or chemical changes that occur when the sample is heated or cooled". The TG-DTA apparatus is a thermal analysis apparatus capable of performing both thermogravimetric (TG) and differential thermal analysis (DTA) of samples. For example, the TG-DTA apparatus described in Japan Patent No. 6606710 can be used as a TG-DTA apparatus with a sample observation function according to an embodiment of the present disclosure.

A TG-DTA apparatus with a sample observation function according to an embodiment of the present disclosure is a thermal analysis apparatus that measures and calculates physical properties of a sample while changing temperature of the sample by heating or cooling it to obtain thermal analysis data and photographs the sample to obtain image data. According to an embodiment of the present disclosure, The TG-DTA apparatus with a sample observation function and a computer installed with a software controlling the apparatus include a thermal analysis graph display means for displaying a graph of the thermal analysis data relating to temperature or time on a display, a sample image display means for displaying a sample image of the sample data on the display, a color information generation means for generating color information data of range and type selected from the sample image, a color information graph display means for displaying a graph of the color information data relating to temperature or time side by side with the graph of the thermal analysis data relating to temperature or time without superimposing both graphs on the display, and a marker display means for displaying a marker at an arbitrary point on one of the graphs and displaying a marker on others of the graphs at a point whose measurement time is synchronized with the point where the marker is displayed. Further, the marker display means may move the marker displayed on one of the graphs and correspondingly moves the marker displayed on the other of the graphs. Further, the marker display means may move the marker displayed on the graph in response to selecting a value within a predetermined temperature or time range with the slider bar.

Figure 17:
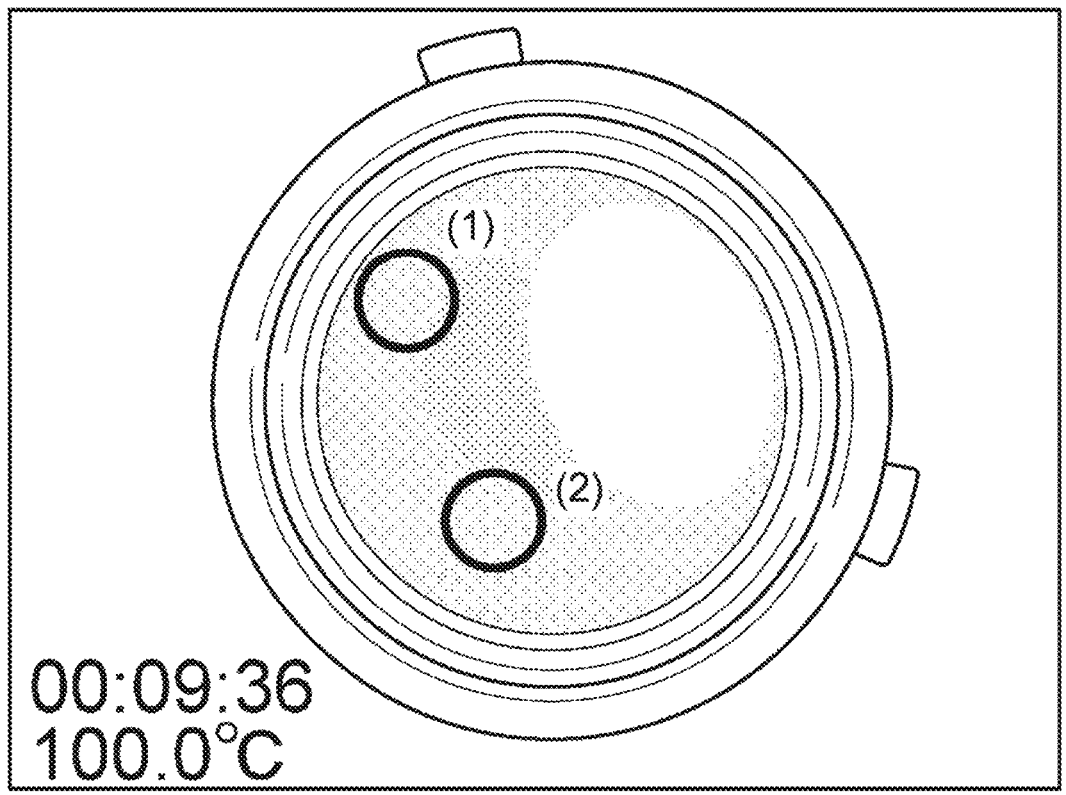
FIG. 17 is a diagram showing a screen for selecting multiple ranges for generating color information data from a sample image by a color information generation means of a thermal analysis apparatus according to an embodiment of the present disclosure.
Figure 18:
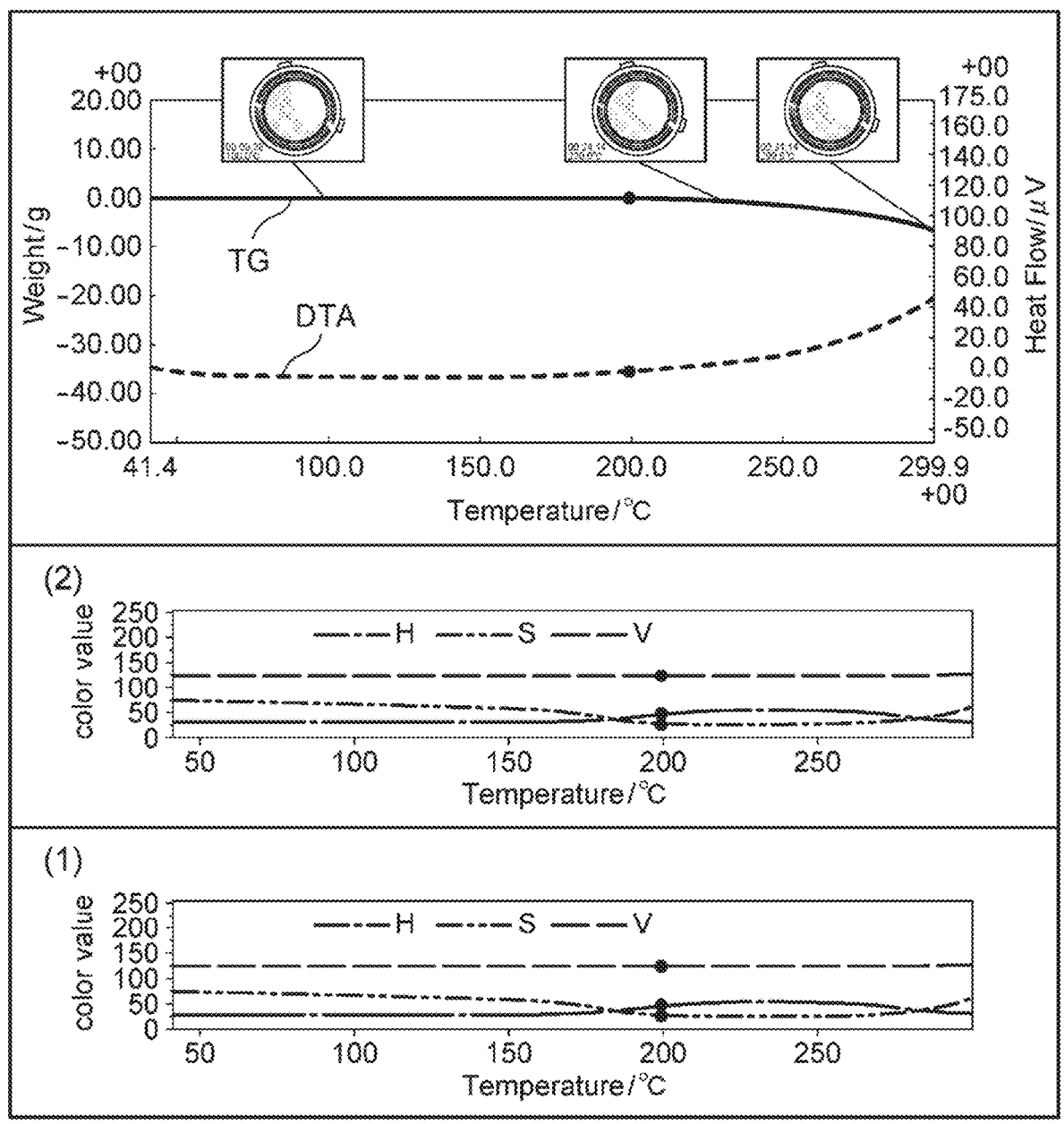
FIG. 18 is a diagram showing a graph of DSC data and graphs of color information data from multiple locations on a sample, displayed by the thermal analysis apparatus according to an embodiment of the present disclosure.

Referring to FIGS. 17 and 18, the following description relate to the color information generating means which is further provided with a configuration and functions that allow multiple selections of ranges for generating color information data from the sample image.

The thermal analysis data obtained by measuring the change in state of a sample while changing the temperature of the sample with a thermal analysis apparatus is data about the entire sample. However, the time of crystallization or transition of a sample is not the same throughout the sample, but often differs depending on the location in the sample. Therefore, the color information generation means according to an embodiment of the present disclosure is further equipped with a configuration and functions that allow multiple selections of the range for generating color information data from the sample image taken synchronously with the measurement by the sample observation type thermal analysis apparatus. Referring to FIG. 17, this means of generating color information allows two ranges or locations to be selected from the sample image to generate color information. Additionally, the color information generating means can select various types of color information to be generated, such as "RGB," "CMYK." "CIE Lab," and "HSV.

FIG. 18 shows an example of a graph of thermal analysis data and a graph of color information data for multiple locations displayed by a thermal analysis apparatus according to an embodiment of the present disclosure. As for the graph of the thermal analysis data, a graph of TG data in which the horizontal axis is temperature (Temperature, unit: ° C.) and the left vertical axis is mass (Weight, unit: grams (g).) and a graph of DTA data in which the horizontal axis is the temperature (Temperature, unit ° C.) and the vertical axis is the heat flow (Heat flow, unit: ° F.). It is also possible to select one or more arbitrary points on the graph of the thermal analysis data and display a sample image of each point. In FIG. 18, sample images of three points are displayed on the TD graph. It is possible to display the sample image on the DTA graph as well. Furthermore, the graphs of the color information data (H, S, V) generated from the two locations selected from the sample image are displayed side by side without being superimposed on each other and below the graph of the thermal analysis data.

As shown in FIG. 18, by displaying the graph of thermal analysis data and the color information graphs of multiple portions of the sample image to be compared side by side without superimposition, it is possible to compare and evaluate the change in state of the sample and the time of change with temperature change at different locations on the sample.

When there are many areas or locations in the sample image for which color information data is to be generated, if the graphs of the thermal analysis data and the graphs of all color information data from multiple locations are displayed side by side on the display without superimposition, the graphs are displayed in small size and are difficult to see. To avoid this, the color information data to be displayed may be selected once, and the graphs of the selected color information data at multiple locations may be color-coded and overlaid.

The thermal analysis apparatus and the computer installed with the software controlling the thermal analysis apparatus according to an embodiment of the disclosure may be further provided with constitution and function as a gradation display means for displaying on a display a gradation of colors generated from the color information data and arranged in correspondence with temperature or time. In particular, when there are multiple ranges or locations in the sample image for which color information data is to be generated, by displaying a gradation (color bar) that arranges the colors further generated from the color information data (RGB values) generated for each of the multiple locations, the actual color and color change for each location of the sample can be easily grasped visually. Therefore, by analyzing the graphs of the thermal analysis data together, it is possible to evaluate in detail the change in state of the sample with temperature change for each location of the sample.

The present disclosure is not limited to the above embodiments, but also includes various variations and equivalents included within the scope of the disclosure and the technical concept of each component of the disclosure.

For example, the thermal analysis apparatus of the present disclosure is not limited to consists of a plurality of apparatuses and/or devices such as a differential scanning calorimetry (DSC) or TG-DTA apparatus, a cooling unit, a computer with control software installed, an input device, a display. The thermal analysis apparatus of the present disclosure may be configured integrally with a part or all of these apparatuses. The computer installed with control software may also control multiple differential scanning calorimetry (DSC) or TG-DTA instruments or other thermal analysis instruments. A part or all of the control software may also be installed on a server on the cloud.

The thermal analysis apparatus of the present disclosure is not limited to differential scanning calorimetry (DSC) apparatus or TG-DTA apparatus, but may be thermogravimetry (TG) apparatus, differential thermal analysis (DTA) apparatus, thermomechanical analysis (TMA) apparatus, and various other thermal analysis apparatus.

INDUSTRIAL APPLICABILITY

The present disclosure can be used to provide a thermal analysis apparatus capable of analyzing in detail changes in the state of a sample while ascertaining and relating in detail changes in the color of the sample due to changes in the temperature of the sample, and control software to realize such a thermal analysis apparatus.

What is claimed is:

1. A thermal analysis apparatus, comprising:
   circuitry configured to
      measure and calculate physical properties of a sample while changing temperature of the sample by heating or cooling it to obtain thermal analysis data and photographs the sample to obtain image data,
      display a graph of the thermal analysis data relating to temperature or time on a display;
      display a sample image of the sample data on the display;
      generate color information data of range and type selected from the sample image;
      display a graph of the color information data relating to temperature or time side by side with the graph of the thermal analysis data relating to temperature or time without superimposing both graphs on the display; and
      display a marker at an arbitrary point on one of the graphs and display a marker on others of the graphs at a point whose measurement time is synchronized with the point where the marker is displayed.

2. The thermal analysis apparatus according to claim 1, wherein the circuitry is further configured to
   move the marker displayed on one of the graphs and correspondingly move the marker displayed on the other of the graphs.

3. The thermal analysis apparatus according to claim 1, wherein the circuitry is further configured to
   move the marker displayed on the graph in response to selecting a value within a predetermined temperature or time range with a slider bar.

4. The thermal analysis apparatus according to claim 1, wherein the circuitry is further configured to
   select one or more ranges for generating color information data from the sample image.

5. A non-transitory computer-readable storage medium storing computer-readable instructions thereon which, when executed by a computer, cause the computer to perform a method, the method comprising:
   measuring and calculating, by circuitry, physical properties of a sample while changing temperature of the sample by heating or cooling it to obtain thermal analysis data and photographs the sample to obtain image data,
   displaying a graph of the thermal analysis data relating to temperature or time on a display;
   displaying a sample image of the sample data on the display;
   generating color information data of range and type selected from the sample image;
   displaying a graph of the color information data relating to temperature or time side by side with the graph of the thermal analysis data relating to temperature or time without superimposing both graphs on the display; and
   displaying a marker at an arbitrary point on one of the graphs and displaying a marker on others of the graphs at a point whose measurement time is synchronized with the point where the marker is displayed.

6. The non-transitory computer-readable storage-medium of claim 5, further comprising:
   moving the marker displayed on one of the graphs and correspondingly moving the marker displayed on the other of the graphs.

7. The non-transitory computer-readable storage-medium of claim 5, further comprising:
   moving the marker displayed on the graph in response to selecting a value within a predetermined temperature or time range with a slider bar.

8. The non-transitory computer-readable storage-medium of claim 5, further comprising:
   selecting one or more ranges for generating color information data from the sample image.

9. A method, comprising:
   measuring and calculating, by circuitry, physical properties of a sample while changing temperature of the sample by heating or cooling it to obtain thermal analysis data and photographs the sample to obtain image data,
   displaying a graph of the thermal analysis data relating to temperature or time on a display;
   displaying a sample image of the sample data on the display;
   generating color information data of range and type selected from the sample image;
   displaying a graph of the color information data relating to temperature or time side by side with the graph of the thermal analysis data relating to temperature or time without superimposing both graphs on the display; and
   displaying a marker at an arbitrary point on one of the graphs and displaying a marker on others of the graphs at a point whose measurement time is synchronized with the point where the marker is displayed.

10. The method of claim 9, further comprising:
moving the marker displayed on one of the graphs and correspondingly moving the marker displayed on the other of the graphs.

11. The method of claim 9, further comprising:
moving the marker displayed on the graph in response to selecting a value within a predetermined temperature or time range with a slider bar.

12. The method of claim 9, further comprising:
selecting one or more ranges for generating color information data from the sample image.

* * * * *